(12) United States Patent
Bayer

(10) Patent No.: US 9,489,562 B2
(45) Date of Patent: Nov. 8, 2016

(54) IMAGE PROCESSING METHOD AND APPARATUS

(71) Applicant: 77 ELEKTRONIKA MUSZERIPARI KFT., Budapest (HU)

(72) Inventor: Gabor Bayer, Budapest (HU)

(73) Assignee: 77 Elektronika Muszeripari KFT

( * ) Notice: Subject to any disclaimer, the term of this patent is extended or adjusted under 35 U.S.C. 154(b) by 24 days.

(21) Appl. No.: 14/371,273

(22) PCT Filed: Jan. 9, 2013

(86) PCT No.: PCT/HU2013/000005
§ 371 (c)(1),
(2) Date: Jul. 9, 2014

(87) PCT Pub. No.: WO2013/104937
PCT Pub. Date: Jul. 18, 2013

(65) Prior Publication Data
US 2015/0010218 A1    Jan. 8, 2015

(30) Foreign Application Priority Data
Jan. 11, 2012    (HU) ..................................... 1200017

(51) Int. Cl.
*G06K 9/00*    (2006.01)
*G06K 9/46*    (2006.01)
(Continued)

(52) U.S. Cl.
CPC ......... *G06K 9/00147* (2013.01); *G06K 9/0014* (2013.01); *G06K 9/4628* (2013.01); *G06K 9/628* (2013.01); *G06K 9/6271* (2013.01); *G06K 9/80* (2013.01)

(58) Field of Classification Search
None
See application file for complete search history.

(56) References Cited

U.S. PATENT DOCUMENTS

| | | | | |
|---|---|---|---|---|
| 5,332,968 A | * | 7/1994 | Brown | G01R 33/563 324/309 |
| 6,553,131 B1 | * | 4/2003 | Neubauer | G06K 9/32 382/105 |

(Continued)

FOREIGN PATENT DOCUMENTS

| | | |
|---|---|---|
| EP | 0336608 | 10/1989 |
| EP | 2372645 | 10/2011 |

OTHER PUBLICATIONS

European Patent Office, Notification of Transmittal of The International Search Report and The Written Opinion of The International Searching Authority, or The Declaration, Aug. 30, 2013.

(Continued)

*Primary Examiner* — Shefali Goradia
(74) *Attorney, Agent, or Firm* — Wood Herron & Evans LLP

(57) ABSTRACT

The invention is an image processing method and an apparatus for automatic categorization of elements in an image of a body fluid sample, the apparatus comprising a recognition module (RM) for generating probability maps associated with each category on the basis of visual information appearing in the image, the probability map showing presence probability distribution of the element of the given category, and a decision module (DM) for providing information about the presence of elements of the categories on the basis of an analysis of the probability maps.

The apparatus according to the invention furthermore comprises a calling module (CM) for locating presumably present elements in the image (10) and calling the decision module (DM) regarding each presumably present element, and the decision module (DM) is adapted for taking into account, examining the presence of the element, at least one further probability map other than the probability map (11) associated with the category of the element.

19 Claims, 6 Drawing Sheets

(51) Int. Cl.
*G06K 9/62* (2006.01)
*G06K 9/80* (2006.01)

(56) References Cited

U.S. PATENT DOCUMENTS

2010/0040285 A1* 2/2010 Csurka ............... G06K 9/00624
382/170
2010/0235955 A1* 9/2010 Humphris .............. B82Y 35/00
850/6

OTHER PUBLICATIONS

Barbano P E et al: "Toward Automatic Phenotyping of Developing Embryos From Videos," IEEE Transactions on Image Processing IEEE Service Center, Piscataway, NJ, US, vol. 14, No. 9, Sep. 1, 2005.
Qing Zheng et al: "Direct neural network application for automated cell recognition," Cytometry, vol. 57A. No. 1, Jan. 1, 2004.
Regis Vaillant et al: "An Original Approach for the Localization of Objects in Images," Jan. 1, 1993.

* cited by examiner

IMAGE PROCESSING METHOD AND APPARATUS

This application claims priority, under Section 371 and/or as a continuation under Section 120, to PCT Application No. PCT/HU2013/00005, filed on Jan. 9, 2013, which claims priority to Hungary Application No. P 1208017, filed on Jan. 11, 2012.

TECHNICAL FIELD

The invention relates to a method and an apparatus adapted for processing digital images of objects falling into various categories. The image processing method and apparatus according to the invention aim to recognise and categorise the image elements re presenting such objects, and furthermore preferably to specify automatically the number of such elements in each category.

BACKGROUND ART

There are numerous prior art methods and apparatuses for automatic recognition and categorisation of elements and objects appearing in digital images. Such methods and apparatuses can be applied especially preferably in medical and diagnostic devices for the automatic analysis of body fluids such as urine or blood.

Furthermore, image recognition methods and apparatuses can be applied in all such technical fields, where objects of digital images are to be recognised and categorised. Such technical fields are for example, observation techniques by satellite or telescope, procession of information provided by outdoor security surveillance cameras or the implementation of user comfort functions in digital still and movie cameras.

In U.S. Pat. No. 5,830,141 an image processing method and apparatus are disclosed, which is adapted for the automatic detection of a predetermined type of cancerous area in an X-ray scan. The purpose of the known method and apparatus is the supporting of and contributing to the radiologist's decision making. In this known method, transformed images are made by various filters from the finished X-ray image, and then the original and transformed images are subjected to analysis by a neural network. The complete image or the separately identified one or more examination areas are analysed. In the method, the various image areas are classified in four types of categories in a way that the neural network is used to calculate for each pixel point the probability value that it belongs to a category. In this a way, practically four types of probability maps are generated from the image. Next, on the basis of analysing the probability maps, a decision is made about the category into which the given image area falls. If, in respect of a given image area, two or more categories emerge with a high probability, a decision about the category to be assigned to the image detail is made by the separate analysis and credibility assessment of the given probability map part. The disadvantage of the method is that regarding a given image detail, if several possible categories emerge, it does not rely on information other than the various probability maps, and therefore it is unable to make an analysis of the probabilities of each category in correlation with each other comprehensively for the image. Therefore, this known method and apparatus work with a relatively high error rate. A similar method is disclosed in Barbara P. E. et al: "Toward Automatic Phenotyping of Developing Embryos From Videos" (IEEE Transactions on Image Processing, IEEE Service Center, Piscataway, N.J., US, vol. 14, no. 9, 1 Sep. 2005 (2005-09-01), pages 1360-1371, XP011137594, ISSN: 1057-7149, DOI: 10.1109/TIP.2005.852470.

In U.S. Pat. No. 7,236,623 B2 an image recognition method and apparatus are disclosed for a urinalysis diagnostic system. In this method, the typical visual characteristics concerning the element categories appearing in the image are determined, and then in the light of these characteristics, the elements in the image are categorised by a multi-level neural network analysis. It is a disadvantage of this known approach that a multi-level neural network analysis exclusively follows the decision branching path based on the visual characteristics, and it is unsuitable for the global analysis and categorisation of the image elements.

DESCRIPTION OF THE INVENTION

It is an object of the invention to provide an image processing method and apparatus, which are free of the disadvantages of prior art solutions. It is also an object to provide an image processing method and apparatus, which are capable of comprehensive recognition and categorisation of objects and elements appearing in digital images in correlation with each other. Furthermore, it is also an object to provide an image processing and image element categorising method and apparatus of higher reliability, i.e. lower error rate.

The recognition leading to the invention is that if probability maps relating to each element category are generated from the digital image, and these probability maps are examined in correlation with each other, as well as by involving further characteristic information, the recognition of the presence of each element and their accurate categorisation can be implemented more efficiently and more precisely than in the known solutions.

The objects of the invention can be achieved by the image processing method according to claim 1 and the image processing apparatus according to claim 13. Preferred embodiments are defined in the dependent claims.

BRIEF DESCRIPTION OF THE DRAWINGS

Preferred embodiments of the invention are now described by way of example with reference to the following drawings, where.

MODES FOR CARRYING OUT THE INVENTION

Figure 1:
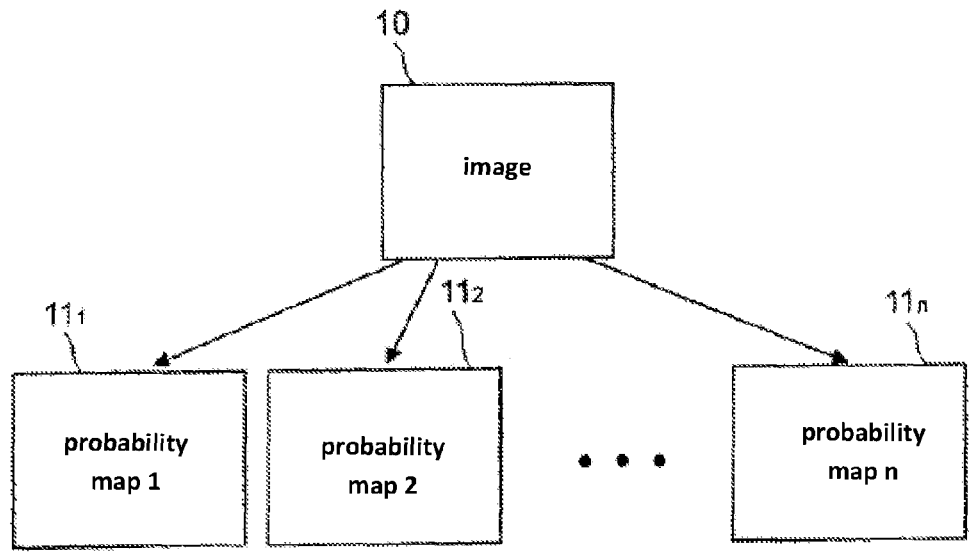
FIG. 1 is a schematic view illustrating the generation of probability maps from a digital image.

The image processing method according to the invention is adapted for the recognition and categorisation of elements being in a digital image 10 showing objects falling into various categories as shown in FIG. 1, and preferably for specifying the total number of elements according to categories as shown in the image.

According to the invention, an element—shown in image 10—means a visual appearance of any object which can be recognised and categorised. The preferred embodiment of the invention is described below for urine analysis, i.e. for the processing of a digital image of a urine sample. In the photo of the urine sample, by way of example, the following objects or elements may be subjected to categorisation:
bacterium (BAC);
squamous epithelial cell (EPI);
non-squamous epithelial cell (NEC);
red blood cell (RBC);
white blood cell (WBC).

According to a preferred embodiment of the invention, elements that can be categorised for example are furthermore
background (BKGND), and
an edge of a particle.

Of course, in addition to the items above, further elements and objects to be categorised may be discovered in the photos of the urine samples. Including the background, altogether typically 10 to 30 element categories can be set up.

Based on the description above, it is especially beneficial if the background, generally representing the largest surface of a digital photo, i.e. the areas in which other elements do not appear, is featured as a separate categorised image element in the analysis. Hence, in this way, by means of a comprehensive analysis according to the invention, the background can be separated from other elements to be categorised, more efficiently than by the known solutions.

In the digital image 10 shown in FIG. 1, the elements to be categorised carry various visual information. In the prior art solutions, primarily the size, shape, contrast and pattern of the elements appearing in the image 10 are taken into consideration for categorisation. The image processing according to the invention deviates from most well-known solutions in that it uses all the pixels of the image 10, which may even represent several million pixel points, instead of the so-called 'feature parameters' described above, which can be calculated from the image of the objects to be found.

On the basis of the visual information detectable in the image 10, probability maps $11_{1-n}$ associated with particular predetermined element categories are generated. Each probability map 11 shows the presence probability distribution of the element of the given category.

The probability maps $11_{1-n}$ may also be generated with the same resolution as that of the image 10. However, in the course of elaborating the invention, it has been recognised that in the case of high resolution images available for example in medical diagnostics, it would be extremely time consuming to perform the analysis of such full resolution probability maps $11_{1-n}$. It has been found that it is sufficient to generate probability maps $11_{1-n}$ in a lower resolution than that of the original image 10 in a way that several pixels of the image 10 are associated with particular probability values of the probability maps $11_{1-n}$. In a preferred embodiment, a raster point in the probability map is assigned to 8×8 pixels of the image 10. This probability value represents the presence probability of the element of the given category regarding the given 8×8 pixels of the image 10. In the course of elaborating the invention, it has been proven that such a reduction of the resolution does not deteriorate the accuracy of categorisation, because such combined probability values also appropriately represent the presence probability in the given image detail, in view of the fact that the typical particle size/object size is larger than 8×8 pixels. The probability maps $11_{1-n}$ can also be presented as probability images, each pixel of which carrying visual information according to the magnitude of the probability value, but it can also be considered as a matrix, each of the values of which corresponding to the probability values being present in the given position.

In the preferred embodiment above, images 10 of 1280× 960 resolution and accordingly probability maps $11_{1-n}$ of 160×120 resolution are applied. For generating the $11_{1-n}$ probability maps, preferably neural network is applied. The visual information appearing in the image is analysed by the neural network, and on the basis of examining this visual information it determines the probability values associated with the various categories in each position. The teaching of the neural network can take place in any suitable way, for example according to the description in the mentioned prior art documents. According to the invention, for generating the probability maps $11_{1-n}$, it is not only the image 10, but also in addition to or instead of the image 10, one or more transformed images generated by various functions from the image or one or more variants of the image 10 in a different resolutions are preferably used. During the experiments leading to the invention, it has been recognised that the probability maps $11_{1-n}$ can be generated with a higher accuracy, if these transformed or different resolution image versions are also used. It has also proven to be advantageous, if the various transformations and variants are supplied as inputs on different levels of the neural network.

The module generating the probability maps $11_{1-n}$ is called a recognition module according to the invention, and this recognition module comprises inputs receiving the pixels of the image 10 or the pixels of the transformed different resolution variant and it also has outputs providing the probability values of the probability maps $11_{1-n}$.

Figure 2:
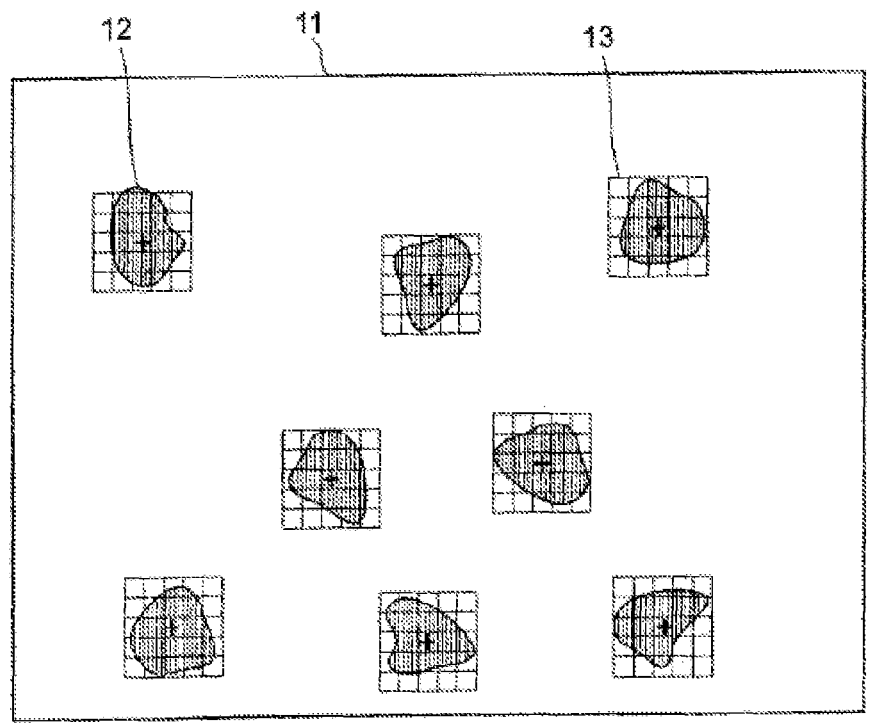
FIG. 2 is a schematic view of groups representing—probably present—elements located in a probability map, and the examination areas associated with the groups.

As a next step, it is examined for each category whether there are presumably present elements in the image 10. The examination for the presumably present elements is performed preferably for each probability map 11 as shown in FIG. 2. During the examination, contiguous groups 12 of probability values above a predetermined threshold level are looked up, and then it is determined on the basis of the size of the groups 12 and/or of the magnitude of probability values in the group 12 whether the group 12 corresponds to a presumably present element.

In the case of small particles (which imply cells, crystals, etc.) it has proven to be suitable to find the elements failing into the given size category in the original image 10 by means of a kind of simple object finding procedure. This procedure, however, can be extremely time consuming, if several elements are present in the image 10 or if the resolution of the image 10 is high. Therefore, it is not advisable to use this object finding method alone; but in the given case such an object finding examination covering a part or certain parts of the image 10 could support the examination performed on the probability map 11.

After determining the presumably present elements, an examination area 13 is determined, which is preferably positioned in the centre of the group 12 corresponding to the presumably present element. The examination area 13 preferably consists of 5×5 probability value in the probability map 11; in the centre or centre of gravity of each group 12, one examination area 13 is determined as shown in the figure.

According to the invention, in relation to each examination area 13, regarding the presence of the element associated with them, at least one further probability map 11 is taken into consideration for making the decision, preferably its probability values being in its examination area 13 positioned identically with the examination area 13 mentioned above. In a way shown in FIG. 3, preferably the examination areas $13_{1-n}$ identically positioned in all $11_{1-n}$ probability maps are involved in making the decision. In these examination areas $13_{1-n}$, in the depicted preferred embodiment, there are 5×5 probability values 14, which represent in the given area the presence probability of the elements falling into various categories, projected to a 0 to 100 value range.

The analysis of the examination areas $13_{1-n}$ is implemented with a device called decision module according to the invention, comprising preferably a neural network having inputs assigned to the pixels in the examination areas $13_{1-n}$, i.e. to the probability values 14. The outputs of the decision module provide preferably the relevant examination area related probability of the elements of each category.

By the joint analysis of the examination areas $13_{1-n}$, object recognition and categorisation can be performed with a higher reliability. This is because in this way the probability values of mutually excluding categories may also be taken into consideration and the contiguous pieces of information in the image 10 can be used in taking the correct decisions.

Figure 3:
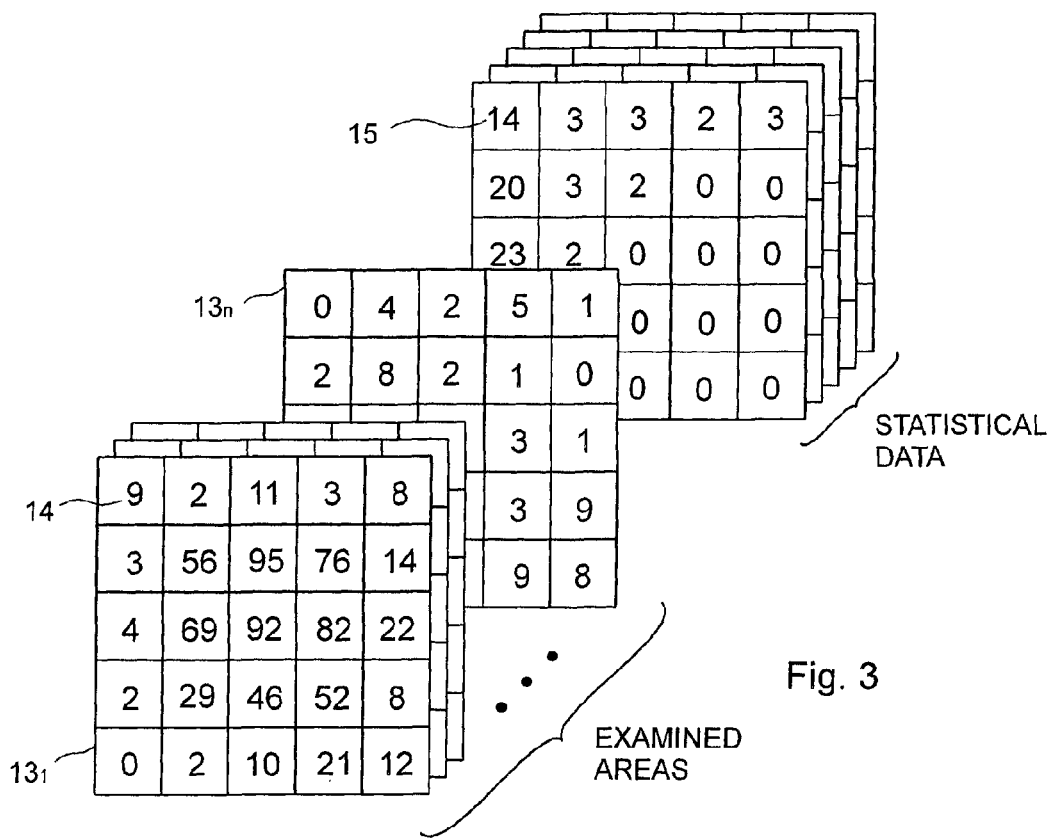
FIG. 3 is a schematic view illustrating exemplary input information of the decision making module of the apparatus according to the invention.

In an especially preferred embodiment shown in FIG. 3, not only the probability values 14 of the examination areas $13_{1-n}$ are used in the analysis of the decision module, but also statistical data 15 associated with the elements are taken into account. These can be local statistical data 15, which relate to the distribution of the probability values 14 in the examination area 13 of the actual probability map 11 and in the identically positioned examination areas 13 of the further probability maps 11.

As local statistical data, around the relevant pin point (the centre of the presumably present element), for example, 5×5 probability values are processed in the case of small particles, and for example, 5×5 probability values calculated from 15×15 probability values (one input value of the decision module is e.g. the average of 3×3 values) are processed in the case of large particles, i.e. the dots/pixels already seen by the decision module are processed. The local statistical data 15 imply pre-processed non-map type of information calculated from these probability values 14. By way of example, preferably five data may be generated from the RBC probabilities: the first data is the number of RBC probabilities failing into the probability value range of 0 to 20 in the 5×5 area. The second data is the number of raster dots/pixels representing the value of 20 to 40, etc. In this way, a much faster decision module learning and a more accurate functioning are experienced, because the decision module learns quickly that in places where the value falling into the value category of 80 to 100 is high (for example, 3 or 4 dots/pixels from the 5×5 dots/pixels represent such a high probability), there is actually an RBC with a high chance. At the same time it is important that a statistical approach only is insufficient, but it is necessary to have map type information defining the distribution as well. A good example is the case when a high probability value is located in one corner of the 5×5 area, but it is there because of a nearby neighbouring particle.

Therefore, one input matrix comprising 5×5 dots/pixels as shown in FIG. 3 may comprise the local statistics of five types of particles, e.g. the first row comprises the number of values falling into the RBC value categories (0 to 20, 20 to 40, 40 to 60, 60 to 80, 80 to 100) associated with the examination area $13_1$, and the second row consists of the number of WBC value categories, etc.

Furthermore, the statistical data 15 may also be global statistical data applying to the distribution of the probability values 14 in the probability maps $11_{1-n}$ outside the examination areas $13_{1-n}$.

As global or image-level statistics, a certain statistical characteristic of the probability values located within the image and yet in the area outside the examined local 5×5 dots/pixels is determined. Since extreme probability values may occur in very low and very high numbers (sparsely or densely filled images), it is advisable to compress the number of elements logarithmically so as to allow representing more magnitudes more efficiently. This is in line with the experience that it is not worth changing the probability of a local decision proportionally with those experienced elsewhere, but a weaker intervention, for example, a logarithmic approach is expedient, Of course, a different suitable function may also be conceived, which is suitable for representing the weight and character of the environment. This transformation function may even be dependent on the particle type, i.e. on the element category.

It is furthermore possible also to make use of comprehensive statistical data 15, which apply to the information stemming from further images 10 belonging together. For example, information coming from further images associated with the same sample can be used for making decisions. This requires at least a two-step iterative decision mechanism. Not only the probability maps, but also the fully evaluated number of elements believed to be certain hits can be used from further images. This is of preference especially in the case of particles which only exist rarely (e.g. in 1 to 5 cases) in ten, fifteen or twenty images of one sample, and their detection is important also in such a small quantity. If, for example, a firm decision can be taken in two cases and there is a third uncertain case in another image, the probability of a positive decision may be increased by the information relating to the other two decisions. If the given particle does not show up at all in the other images, then the probability is obviously lower that the identified uncertain case corresponds to such a particle.

Using the statistical data 15 proves to be extremely beneficial in the image processing method according to the invention. By means of these statistical data the neural network can be supplied with unambiguous guidelines and with comprehensive data and criteria characterising the examination area, the image and the sample. On the basis of these further inputs, the neural network takes decisions with a higher reliability and a lower error rate.

For applying the neural network, it is advisable to feed in the statistical data 15 in a format similar to the examination areas $13_{1-n}$. The examination areas $13_{1-n}$ comprising a map-like probability distribution consist preferably of n×n pixels, and the non-map type and fixed position statistical data 15 are also arranged in one or more n×n format matrices.

Figure 4:
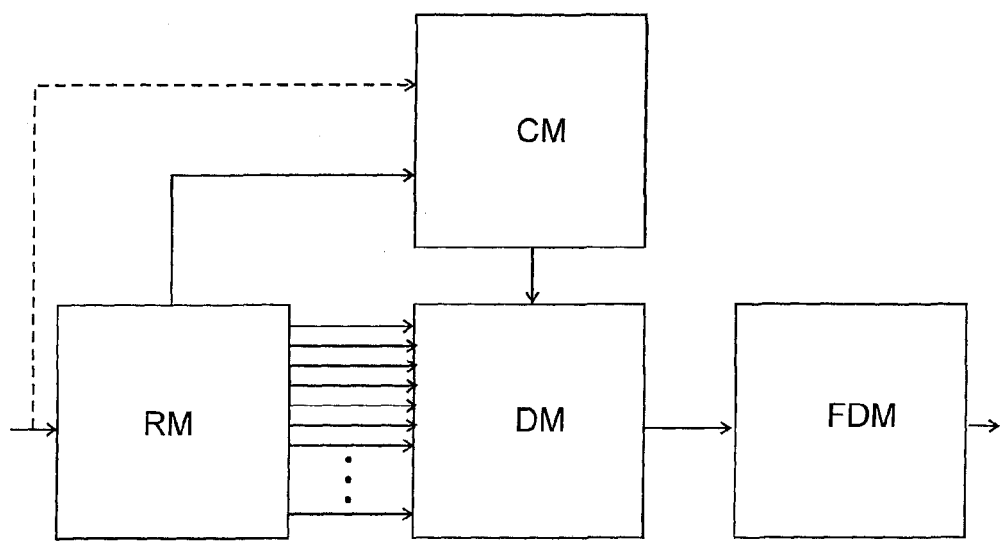
FIG. 4 is a schematic view of the apparatus according to the invention.

FIG. 4 is a schematic view of an apparatus according to a preferred embodiment of the invention. The image 10 or one or more transformed variants thereof or one or more different resolution versions thereof is fed into the recognition module RM. The recognition module RM generates the probability maps $11_{1-n}$, on the basis of which the identification of presumably present elements and to them the assigning of the examination areas 13 take place in each category i.e. for each probability map 11. A call module CM of the apparatus according to the invention calls the decision making module DM to each pin point in each probability map 11. The inputs of the decision making module DM are given by the examination areas $13_{1-n}$ in the probability maps $11_{1-n}$ assigned to the pin point. For determining the presence of the element associated with the given examination area 13, the decision module DM takes into consideration also the probability values in the other examination areas 13, and on this basis it provides information about the presence of elements associated with each category.

An especially preferred embodiment of the method and apparatus of the invention comprises a plurality of RM recognition modules as well, which exhibit a different sensitivity to the various particle types. In this case, the decision module DM preferably receives the map of each recognition module RM, and uses it for the decision. It has been found in the course of our experiments that the application of a plurality of recognition modules RM improves the quality of decisions, because through the expedient configuration of the decision module DM, the advantages of different sensitivities of various recognition modules RM are utilised, and their weaknesses are suppressed.

The neural network of the decision module DM preferably yields the presence probability of the elements falling into each of the categories. On the basis of these probabilities, the final decision can be made by a further final decision making module FDM.

The final decision making module FDM preferably functions in a way that examines the presence probability of the elements, and the elements are only accepted to be present above a predetermined threshold probability. It has been proven during our experiments that it is advisable to define this threshold probability separately for each category, because the elements to be categorised and recognised in the image 10 have typically different probability values.

The essence of plausibility check to be introduced by the final decision making module FDM is that although the number of hits decreases with the increasing of the threshold probability value, the number of missed hits also decreases monotonously along a different curve. For each category, in this case for each particle type, it is advisable to set such a threshold value where the error rate is sufficiently low, and yet the rate of correct recognitions is sufficiently high, in the case of particles which can be recognised with a high reliability and where the occurring of false recognitions is important to avoid, it is worth setting a high threshold value.

Furthermore, it may be advisable to determine the threshold probabilities of the final decision making module FDM not only for each category, but also for each application or within the applications separately for each sample. This is because it may happen that one sample i.e. the series of images consisting of the images 10 have similar visual characteristics, and therefore the probabilities of recognitions and categorisations show a similar trend.

Consequently, according to the invention, the recognition module RM and the decision module DM are preferably implemented as a neural network. According to the invention, each module of the apparatus can be implemented preferably in the form of a computer program module, but the parts or the whole of these modules may even be realized in a hardware form.

The method according to the invention may be supplemented with further steps. For example, there is the analysis of samples in which the elements have a high concentration. In this case, the groups 12 shown in FIG. 2 do not appear in the depicted way, but frequently clinging to or merging into one another. In view of the fact that the group size expected according to the given category, i.e. the probability map 11 is usually known, these clinging to and touching each-other can be recognised in the probability map 11. Preferably, if the size of the group 12 exceeds by a predetermined value of the typical size of the type corresponding to the given category, the group 12 is considered as several presumably present elements touching each-other, and the centres of the examination areas 13 are positioned to the centres of the group parts determined on the basis of the typical size. If clinging together is frequent in a given category and the type of forms clinging together is morphologically different from the separate particles (for example, the circular shapes are distorted side by side), it is advisable to treat the objects clinging together as a separate category.

Figure 5:
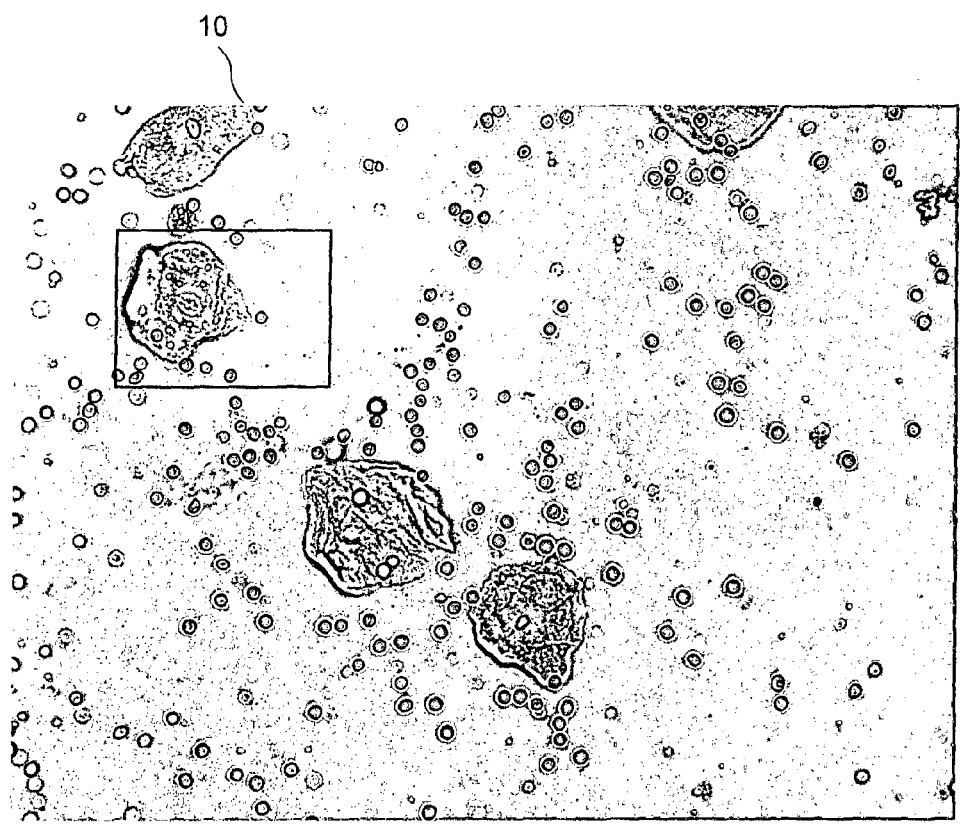
FIG. 5 is an image of a digital urine sample processed by the method according to the invention.
Figure 6:
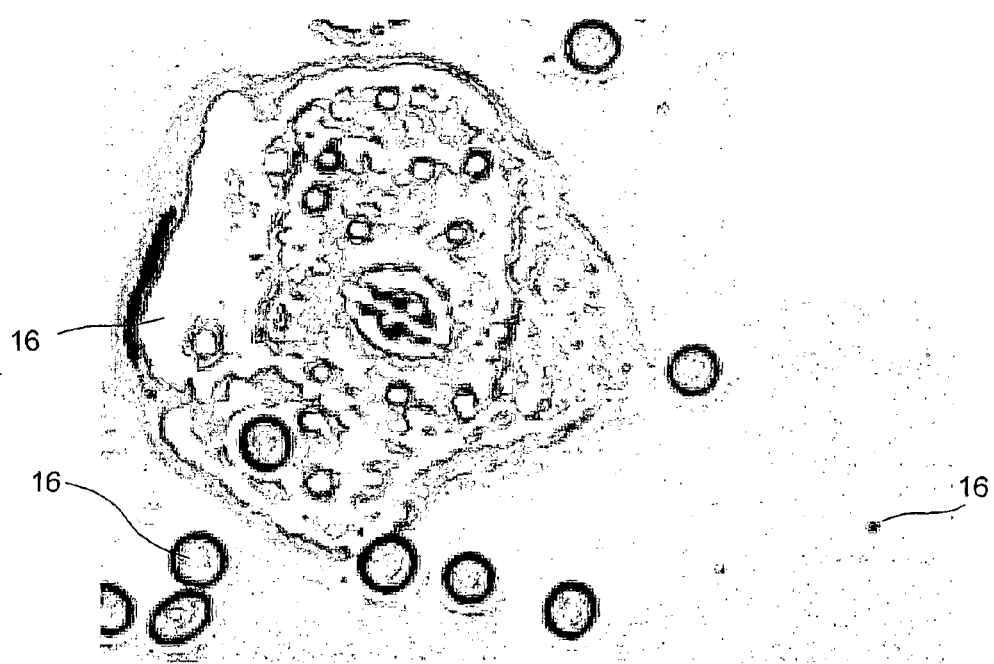
FIG. 6 is the magnification of a marked section of the image of in FIG. 5.
Figure 7:
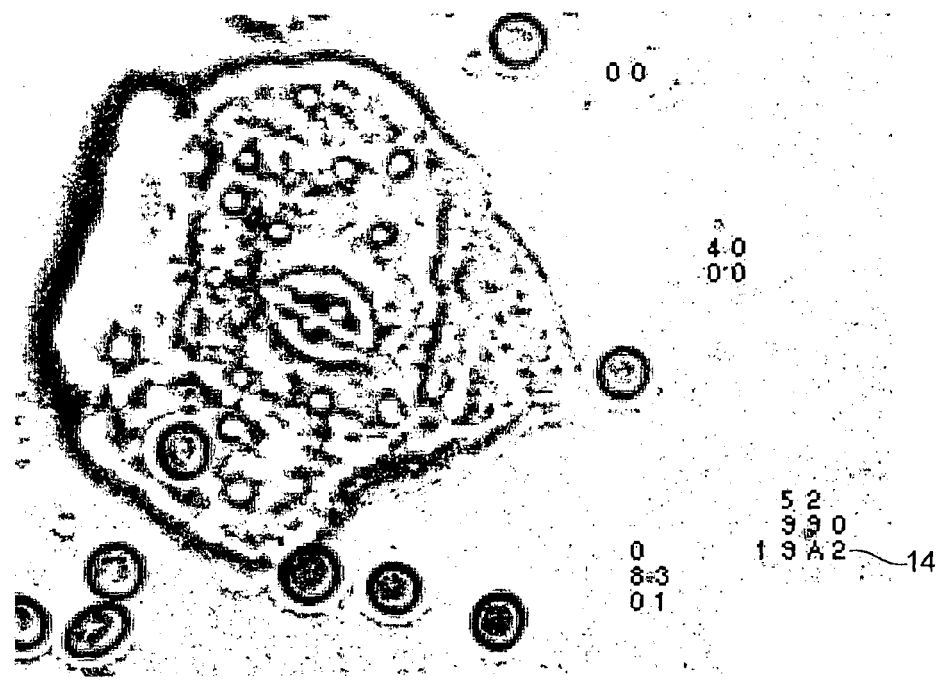
FIG. 7 shows a probability map the probability values relating to bacilli, in the detail according to FIG. 6.

FIG. 5 shows an exemplary image 10 of a urine sample in association with urine analysis, FIG. 6 shows a magnified version of a marked part of the image 10. In FIG. 6 the visual representation of a number of elements 16 to be categorised, i.e. that of the various particles and image elements is shown. In FIG. 7 the image detail according to FIG. 6 is presented in a way that it also shows the probability values of the probability map 11 applying to bacteria (BAC). In the way described above, a probability value 14 is associated with 8×8 pixel points, and it shows in the given area of 8×8 pixel points the probability of bacteria presence. The probability values 14 are preferably represented in a scale ranging from 0 to 100; for the sake of simplicity, the figure depicts the values divided by 10 and rounded to one digit. Zero probability has not been shown. The probability values larger an but rounded to zero have been shown by zero. The character A implies 100% probability.

Figure 8:
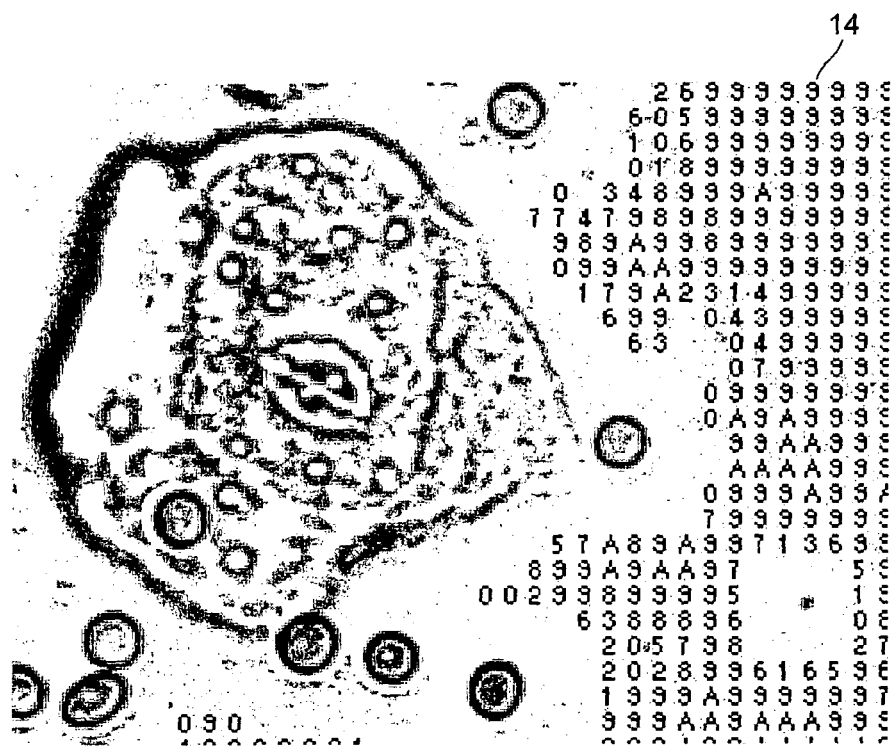
FIG. 8 shows a probability map the probability values relating to the background, in the detail according to FIG. 6.

FIG. 8 also shows the image detail of FIG. 6, but the probability values 14 of the probability map 11 of the background (BKGND) are presented. According to the invention, by such an involvement of the background in the analysis, the further elements to be categorised can be very efficiently separated and isolated. Such an isolation of the elements to be categorised is also shown by the distribution of the probability map 11 appearing in the figure. Such an involvement of the background in the analysis is a so far unknown and unique technique in this special field, and it has extremely increased the efficiency of the preferred embodiment of the invention.

Figure 9:
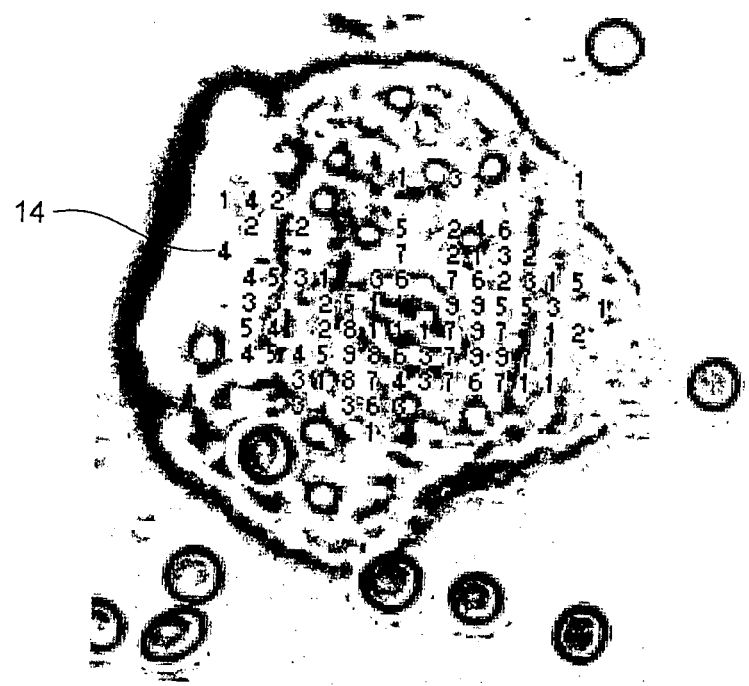
FIG. 9 shows a probability map with probability values relating to squamous epithelial cells, in the detail according to FIG. 6.
Figure 10:
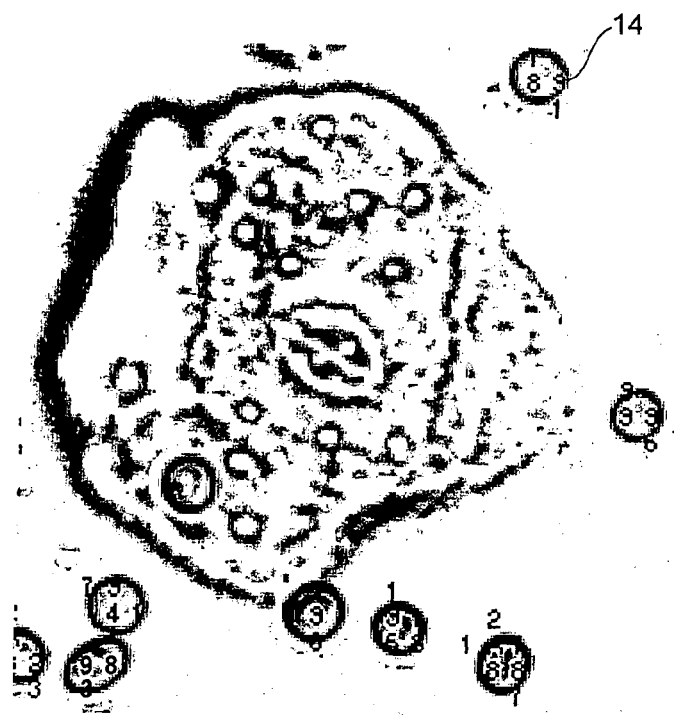
FIG. 10 shows a probability map with probability values relating to red blood cells, in the detail according to FIG. 6.

In FIG. 9 the detail according to FIG. 6 is also shown with the probability values 14 of the probability map 11 applying to the EPI. In FIG. 10 the probability values 14 relating to the RBC are depicted.

Figure 11:
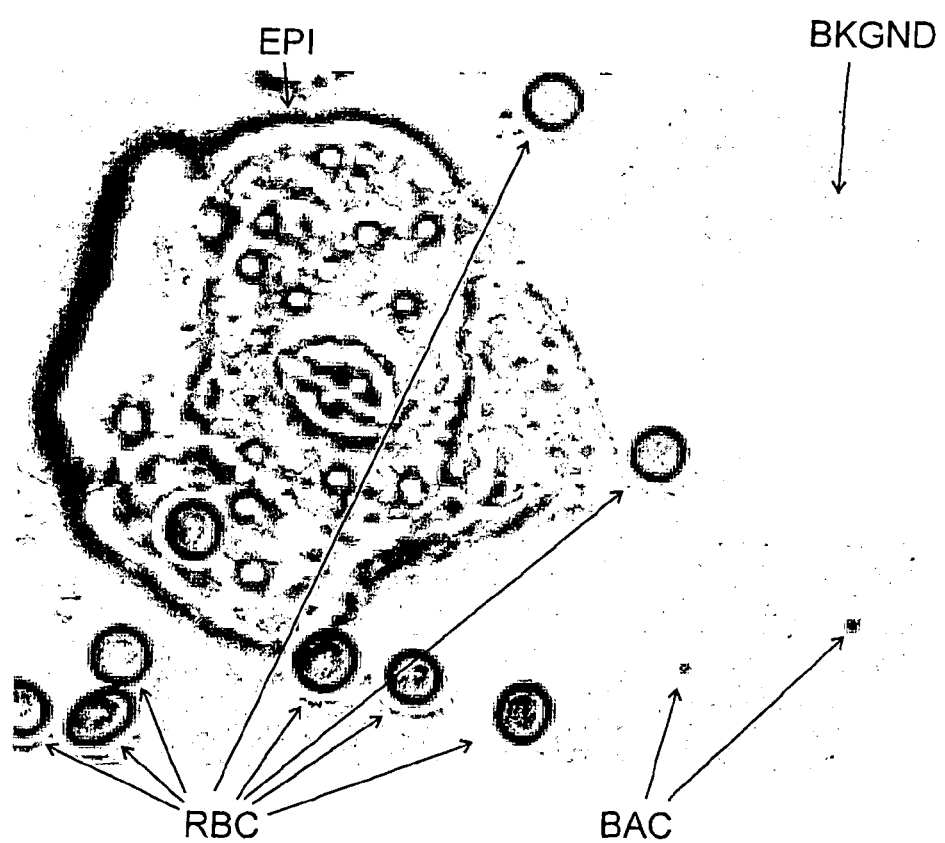
FIG. 11 shows a result of a categorisation obtained by the method according to the invention.

In FIG. 11 the result of decision making by the method and apparatus according to the invention used by way of example is illustrated. It can be seen from the result of decision making that the bacteria only slightly standing out of the background in the given case has also become unambiguously recognisable and categorisable. Concerning the bacterium nearer to the centre of the figure, the division has been greatly facilitated by the fact that the probability map relating to the background assumed zero values at the place of the bacterium, as shown in FIG. 8.

In the description above the invention was presented for the purpose of urine analysis, regarding the images 10 prepared for a urine sample, but of course this does not restrict the applicability of the invention to this technical field. The element recognition and categorisation according to the invention can be applied advantageously also in further applications mentioned in the introduction, which said applications necessitate image recognition and categorisation.

The invention is not limited to the preferred embodiments described in details above, but further variants and modifications are possible within the scope of protection defined by the claims.

For example, the invention is not only suitable for processing two-dimensional images, but it can be used also for the analysis of images generated by a three-dimensional imaging process. In this case the probability maps are preferably also three-dimensional maps, and the examination areas are three-dimensional spatial parts of these maps.

The invention claimed is:

1. An image processing method for categorizing elements in an image of a body fluid sample, the method comprising:
    detecting visual information in the image;
    generating a probability map for each of a plurality of categories of elements based on the detected visual information in the image, each probability map showing a probability distribution for the presence of an element of the corresponding category; and
    determining, for each element in the plurality of categories, whether or not the element is present based on the corresponding probability map,
    wherein the determining comprises:
        examining the generated probability map for each category to determine whether there are presumably present elements in the image,
        positioning an examination area for each presumably present element on the probability map associated with the corresponding category of the element, and
        determining the presence of each presumably present element by evaluating an examination area of the probability map associated with a given category and evaluating an identical examination area of at least one further probability map, and determining whether a contiguous group of probability values corresponds to the presumably present element based on the size of the group and/or of the magnitude of the probability values in the group,
    wherein the contiguous group of probability values is determined to be above a threshold level in the probability map associated with the given category.

2. The method according to claim 1, wherein the determining further comprises considering statistical data calculated from probability values related to the elements in determining the presence of elements associated with the examination area.

3. The method according to claim 2, wherein the statistical data are local statistical data relating to a distribution of probability values in the examination area of the probability maps.

4. The method according to claim 2, wherein the statistical data are global statistical data relating to a distribution of probability values outside the examination area of the probability maps.

5. The method according to claim 2, wherein the statistical data are comprehensive statistical data relating to information from further images belonging together.

6. The method according to claim 1, wherein the determining further comprises performing a search for the presumably present elements in the image based on an object finding algorithm, and the result of this search is used in defining the groups.

7. The method according to claim 1, further comprising positioning the center of the examination area to the center of the group corresponding to the presumably present element.

8. The method according to claim 1, wherein, in addition to or instead of the image, one or more transformed images generated from the image or one or more different resolution variants of the image are used for generating the probability maps.

9. The method according to claim 1, wherein the probability map has a lower resolution than the image, and each probability value of the probability map is associated with a given area consisting of several pixels in the image.

10. The method according to claim 1, further comprising determining the probability of the presence of the elements, and determining the elements to be present only above a threshold probability, wherein the threshold probability is defined separately for each category.

11. The method according to claim 1, wherein the determining further comprises consideration of the background of the image, not covered by other elements, as an element falling into a separate category.

12. An image processing apparatus configured to perform automatic categorization of elements in an image of a body fluid sample, the apparatus comprising:
    a recognition module (RM) configured to generate probability maps associated with each of a plurality of categories of elements based on visual information detected in the image, each probability map showing a probability distribution of the presence of an element of the corresponding category;
    a decision module (DM) configured to determine, for each element in the plurality of categories, whether or not the element is present based on the corresponding probability map; and
    a calling module (CM) configured to locate presumably present elements in the image and to call the DM for each presumably present element in an examination area located at a position corresponding to the presumably present element in the probability map associated therewith,
    wherein the DM further comprises a neural network that performs the following operations:
        receiving the probability values that are located within the examination area;
        receiving statistical data calculated from probability values related to the elements;
        generating and outputting a probability of the presence of the elements falling into each category in the examined area,
    wherein the probability of the presence of the elements falling into each category is determined by evaluating an examination area of the probability map associated with a given category and evaluating an identical examination area of at least one further probability map, and determining whether a contiguous group of probability values corresponds to the presumably present element based on the size of the group and/or of the magnitude of the probability values in the group, wherein the contiguous group of probability values is determined to be above a threshold level in the probability map associated with the given category.

13. The apparatus according to claim 12, wherein the neural network further performs the following operations:
   receiving pixels of the image or in addition to or instead of the pixels of the image, receiving pixels of one or more transformed images generated from the image or receiving pixels of one or more variants of the image with a different resolution, and
   generating and outputting probability values of the probability maps, the probability map having a lower resolution than that of the image.

14. The apparatus according to claim 12, wherein the statistical data are local statistical data relating to a distribution of probability values in examination areas of probability maps.

15. The apparatus according to claim 14, wherein the examination areas consist of n×n probability values and the statistical data are also arranged in one or more n×n format matrices.

16. The apparatus according to claim 12, further comprising a final decision making module (FDM) that determines the elements as being present only above a threshold probability, wherein the threshold probability is determined separately for each category.

17. The apparatus according to claim 12, wherein the DM is configured to determine the presence of each presumably present element by evaluating an examination area of the probability map associated with a given category and evaluating an identical examination area of at least one further probability map, and determining whether a group of probability values corresponds to the presumably present element based on the size of the group and/or of the magnitude of the probability values in the probability map and the at least one further probability map.

18. The apparatus according to claim 12, wherein the statistical data are global statistical data relating to a distribution of probability values outside the examination area of the actual probability map and outside an identically positioned examination area of at least one further probability map.

19. The apparatus according to claim 12, wherein the statistical data are comprehensive statistical data relating to information from further images belonging together.

* * * * *